United States Patent [19]

Bermel et al.

[11] Patent Number: 5,196,072
[45] Date of Patent: Mar. 23, 1993

[54] METHOD AND APPARATUS FOR CONTROLLING METAL OXIDE FUME GENERATION DURING SUBDIVISION OF A BODY CONTAINING METAL VALUES

[75] Inventors: Curtis L. Bermel, Chicago, Ill.; Creseda L. Douglas, Upper Darby, Pa.

[73] Assignee: Liquid Air Corporation, Walnut Creek, Calif.

[21] Appl. No.: 626,207

[22] Filed: Dec. 12, 1990

[51] Int. Cl.$^5$ .............................................. B23K 7/00
[52] U.S. Cl. ........................................ 148/194; 266/48
[58] Field of Search .......................... 266/48, 74, 75; 148/9 R, 194

[56] References Cited

U.S. PATENT DOCUMENTS 5,000,426 3/1991 Campana et al. ...................... 266/48

FOREIGN PATENT DOCUMENTS

383184A1 7/1990 European Pat. Off. .

OTHER PUBLICATIONS

*Metals Handbook,* Ninth Edition, vol. 6. pp. 40–41 Oct., 83.
Turkdogan, E. T., P. Grieveson, and L. S. Darken, "Enhancement of Diffusion-Limited Rates of Vaporization", Jan. 31, 1963, pp. 1647–1654.

*Primary Examiner*—Scott Kastler
*Attorney, Agent, or Firm*—Curtis, Morris & Safford

[57] ABSTRACT

A method and apparatus are disclosed for controlling metal oxide fume generation during the oxygen-induced subdivision into smaller physical units of a body containing metal values in a control gas-enriched oxygen environment in the absence of a fuel gas.

14 Claims, 8 Drawing Sheets

METHOD AND APPARATUS FOR CONTROLLING METAL OXIDE FUME GENERATION DURING SUBDIVISION OF A BODY CONTAINING METAL VALUES

FIELD OF THE INVENTION

The present invention relates to a process and an apparatus for controlling metal oxide fume generation during the oxygen-induced subdivision of a body containing metal values, such as slag and/or scrap.

BACKGROUND

Slag is a common by-product of metal refining. All steelmaking processes including open-hearth, basic oxygen, electric arc furnace, argon-oxygen decarburization and other processes produce slag in their respective refining processes. Other metallic refining processes such as aluminum smelting, copper smelting and blast furnace processes produce slag. Metal refining is a means of separating a particular desired metal from the undesirable or waste product (in the form of slag.)

One of the inherent drawbacks in refining is that a certain amount of metal values being refined are oxidized in the refining process and precipitate out of the molten bath into the slag. Consequently, there are recoverable metals values, or "metallics", in most metal refining slags. Metal refiners have the option of recovering these metallics and they may then be used as part of an overall total metallic charge for a particular refining process.

There are many means of collecting slag. Open hearth furnaces are known for their flush holes whereby the center door of the furnace is the flush door. A hole in the floor allows slag seeping out of the furnace to pour directly into a pit below. After each heat, this pit is cleared of slag by being plowed or bucketed (via overhead crane bucket). The slag is then loaded into slag pots via mechanical means and then transported to a slag preparation site. Similarly, aluminum and copper smelting operations are noted for their slag dross.

Basic oxygen furnaces pour slag directly into a slag pot. Slag sticking to slag pots has long been a hindrance to steelmakers. Through the years, a common practice has developed to prepare a slag pot to receive slag by dumping sand or mill dirt or both into the bottom of each pot so as to deoxidize the slag as it enters the pot and thereby keep it from foaming. This also prevents the slag from sticking to the pot's lower quadrant. With the pot's shape being rather conical, the resulting shape of the slag when solidified is a frustoconical or elliptical solid body or "button".

Although slag pot designs vary, their shapes are basically similar. Electric furnace slag pots look much the same as basic oxygen slag pots. Argon-oxygen decarburization slag pots (depending on the size of the furnace) are generally smaller than most basic oxygen furnace slag pots. Hence, many argon-oxygen decarburization facilities spray a silicon coating on the walls of their slag pots rather than put sand in the bottom. The resulting shape of AOD slag is conical rather than that of a button. Aluminum and copper slags are skimmed from the bath and placed in a dross bucket. For the sake of simplicity, slag is in referred to in the forthcoming description of the present invention as being in the shape of a button.

Regardless of the shape of the solidified slag, there generally are a significant amount of metallics in it. Metal refiners wish to recover these metallics since they have already paid for them. For example, It is reasonable to recycle iron bearing slag and recharge it after it has been prepared.

After slag has been loaded into a slag pot, it is usually transported outside of the furnace building to a slag preparation area. This area is commonly referred to as the "slag pits". The slag buttons are transported to the slag pits and dumped. In the case of furnace slag, the slag is crushed, screened and magnetically separated according to its metallic content. Slag high in metallic content is charged back to the steelmaking furnace for iron recovery. Processed slag which does not meet the mills' criteria for contained iron is subsequently sold as construction aggregate. Buttons are frequently too thick to be broken with a drop ball. In order to prepare this large mass of ladle remains for the crusher, the button must be sectioned by a fuel gas torch while still warm. Buttons fresh out of the mill are extremely hot and usually molten in the center. Most slag burning is preferred to be done on buttons that are still warm since it requires less fuel to cut the button into sections. A typical button may range in thickness from four to eight feet and weigh up to 40 tons.

This setup is characteristic of many slag preparation operations. In addition to steel buttons, revert scrap as billets or finished mill product are also burned with oxygen and fuel gas torches. The scrap is torch cut into appropriate lengths, usually two to four feet long, for charging in the electric arc or basic oxygen furnace. Large mill torches, such as the Victor HC-1500C Scrap Torch, utilize natural gas or propane as fuel gas. Oxygen is subsequently introduced at high flowrates to cut or oxidize the metal by self-sustaining exothermic reactions. Oxygen flowrates from 50 to 80 standard cubic feet per minute at 75 to 150 pounds per square inch (gauge) are common for mill torches.

The inherent problem associated with these cutting operations of slag or scrap is the generation of metallic oxide fumes. These process fumes are large billowing clouds of oxide vapors typically orange and brown in color. Not only are the fumes uncomfortable for the torch operator, but they present an environmental problem for mill sites. These operations are performed outdoors where wind creates additional problems by dispersing the oxide clouds throughout neighboring premises and depositing the oxides on cars and buildings, or sometimes, into populated areas. This raises concerns about the environmental impact of oxide fumes from lancing or cutting operations as a potential pollutant.

It is believed that previous efforts directed to decreasing oxide fumes have been directed to the use of carbon dioxide in the oxygen feed of an oxygen-acetylene cutting torch where a fuel gas—acetylene—is used in cutting scrap. This is unsatisfactory for a number of reasons. This approach requires that a fuel gas be used along with its attendant cost and handling complexity. Further it necessitates that not only must the appropriate fuel gas-oxygen mixture be preserved to support cutting combustion but that somehow the carbon dioxide-oxygen mixture also must support that cutting combustion while attempting to decrease oxide fumes.

OBJECT OF THE INVENTION

It is an object of the present invention to provide a method and apparatus for controlling metal oxide fume generation during the oxygen-induced subdivision of a

SUMMARY OF THE INVENTION

In accordance with the present invention a method is provided for controlling metal oxide fume generation during the oxygen-induced subdivision into smaller physical units of a body containing metal values, said method comprising the steps of:

a. providing a body containing metal values and b. subdividing said body with a consumable lance using gaseous oxygen in a control gas-enriched, oxygen environment in the absence of a fuel gas.

Also in accordance with the present invention an apparatus is provided for the oxygen-induced subdivision into smaller physical units of a body containing metal values which decreasing metal oxide fume generation during said oxygen-induced subdivision, comprising means for subdividing said body with gaseous oxygen in a control gas-enriched, oxygen environment in the absence of a fuel gas, including a source of gas consisting essentially of oxygen and a control gas and a consumable lance member operatively connected to said source gas.

DESCRIPTION OF THE PREFERRED EMBODIMENTS

The preferred method comprises a) providing a body containing metal values and b) subdividing that body with a consumable lance using gaseous oxygen in a carbon dioxide-enriched, oxygen environment in the absence of a fuel gas. The preferred apparatus comprises means for subdividing the body with gaseous oxygen in a carbon dioxide-enriched, oxygen environment in the absence of a fuel gas, including a consumable lance member operatively connected to source means of gas consisting essentially of oxygen and carbon dioxide. In addition the method and apparatus of the present invention can be used to increase metal fume generation during the oxygen-induced subdivision of a body containing metal values into smaller physical units by replacing the carbon dioxide with nitrogen or an inert gas selected from Group 8 of the Periodic Table.

In the process and apparatus of the present invention a body containing metal values, such as a slag button or scrap, is subdivided by cutting or lancing with a consumable lance using gaseous oxygen in a carbon dioxide-enriched oxygen environment in the absence of a fuel gas.

The consumable lance is a cutting lance which is provided with an outlet pipe which is consumed in a highly exothermic reaction with the gaseous oxygen. Desirable consumable materials for use in connection with bodies having iron as their primary desired metal values are iron and steel, preferably steel.

Surprisingly, we have found that the use of carbon dioxide-enriched oxygen with a consumable lance for cutting slag or scrap is most beneficial in decreasing visible metal oxide fumes generation. In the case of iron-bearing slags the process and apparatus of the present invention are capable of providing greater than 80% suppression of these orange/red oxides based on visual observation.

Slag buttons are sectioned into "slices" using oxygen of standard purity (99.5%) through a consumable lance pipe. Button size and their number generally determine the size and flow rate of the lancing apparatus. The oxygen lance pipe generally ranges from $\frac{3}{8}$ to $1\frac{1}{4}$ inches in diameter for button burning. Oxygen flowrates from 60 to 150 standard cubic feet per minute at 120 to 150 pounds per square inch (gauge) are generally used in this application. For instance, if a basic oxygen furnace generates 20 ton buttons (8' dia. ×4' thick), the following lancing apparatus is typical:

$\frac{1}{2}$ inch consumable lancing pipe

Oxygen flow = 150 Standard cubic feet per minute at pressure of 120 pounds per square inch gauge While the method and apparatus of the present invention will be described with respect to the subdivision of slag buttons, it should be understood that the method and apparatus are applicable to the subdivision of scrap as well.

Figure 3:
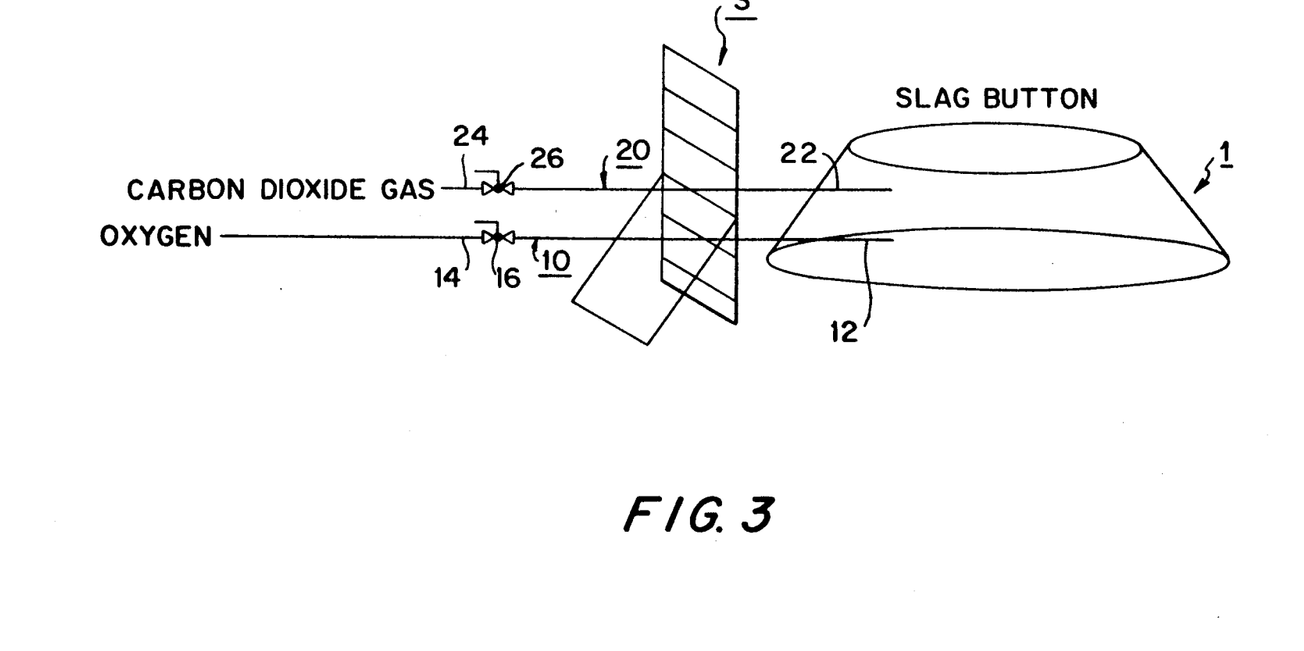
FIG. 3 is a diagrammatic illustration of a further embodiment of an apparatus in accordance with the present invention.
Figure 4:
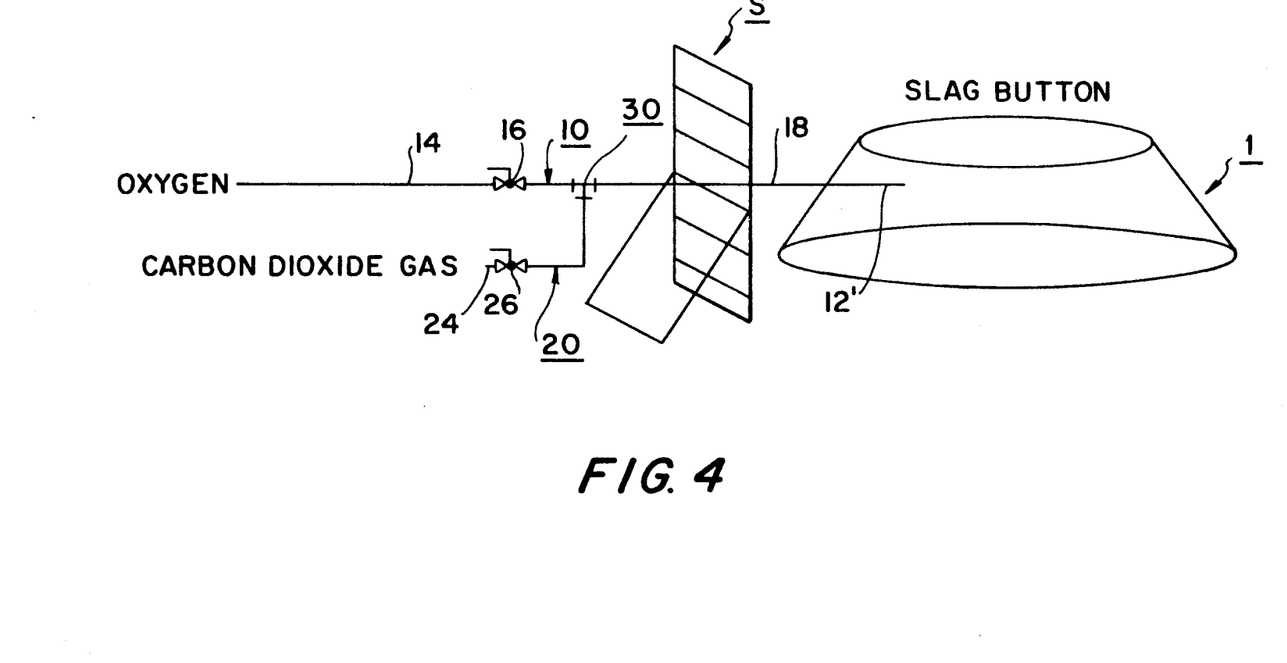
FIG. 4 is a diagrammatic illustration of a still further embodiment of an apparatus in accordance with the present invention.

Carbon dioxide enrichment may be provided to the gaseous oxygen environment in which subdivision occurs by 1) Injecting solid carbon dioxide, preferably in subdivided form on the button (such as carbon dioxide "snow") into, on top of or around the cutting or burning zone from a horn attached to a feed pipe separate from the consumable lance pipe (see FIG. 1) or 2) Injecting solid carbon dioxide into, on top of or around the cutting or burning zone on the button directly from a feed pipe separate from the consumable lance pipe (see FIG. 2), or 3) Injecting gaseous carbon dioxide into, on top of or around the cutting or burning zone on the button from a feed pipe separate from the consumable lance pipe (see FIG. 3), or 4) Injecting gaseous carbon dioxide into the cutting or burning zone on the button by co-injecting oxygen and carbon dioxide into the consumable lance pipe and flowing a mixture of these gases to both cut or burn the slag and simultaneously suppress fumes (see FIG. 4.)

Generally speaking, if oxygen is flowing at a rate of about 150 standard cubic feet per minute at a pressure of 110 pounds per square inch (gauge), the addition of carbon dioxide flowing at 50 standard cubic feet per minute at a pressure of 110 pounds per square inch (gauge) is capable of reducing the orange/red oxide plume by approximately 80% based on visual inspection. Since every slag button is unique and no two buttons will have the same chemistry, the flowrate and pressure for carbon dioxide (as well as that of the oxygen) may be varied depending on the chemistry and temperature of the slag button that is being cut or burned, i.e. subdivided. In accordance with the present invention varying ratios of carbon dioxide, are capable of producing respective levels of oxide cloud reduction. For example, if a steelmaking slag button's chemistry is relatively low in iron content, less carbon dioxide will be required to reduce oxide cloud size than for that of a slag with a higher iron content. In accordance with the present invention a mixture richer than one part of carbon dioxide on a volume basis to three parts of oxygen on a volume basis hampers the slag burning process sufficiently that cutting or burning cannot be readily maintained. Describes flow rates and pressures for oxygen and carbon dioxide are as follows:

|  | FLOW | PRESSURE |
|---|---|---|
| $O_2$ | 70–150 SCFM[1] | 60–200 psig[2] |
| $CO_2$ | 15–60 SCFM | 60–200 psig |

[1]Standard cubic feet per minute
[2]Pounds per square inch (gauge)

Slag high in metallic content, primarily FeO, can be lanced with carbon dioxide percentages up to 25% in pure oxygen. As metallic content is less in higher lime-bearing slag, the operator must reduce the ratio of $CO_2$ in oxygen. However, the reduction of carbon dioxide at the lance does not change the effect of the process in regards to fume suppression. The initiation of a torch path while carbon dioxide is flowing hinders the burning path initiation. Therefore, the best method of initiating burning results is with straight gaseous oxygen (i.e. with carbon dioxide flow off or not present) to get the burn started. Consequently, an initial slag puddle using pure oxygen only is established before introduction of the oxygen and carbon dioxide mixture. During the time a slag puddle is initiated, the typical orange vapor is visible. Within about 30 seconds, carbon dioxide is added in ratio to the gaseous oxygen and adjusted to the appropriate rate and pressure with respect to the oxygen flow rate and pressure, slag chemistry and button temperature. The orange plume quickly disappears and is replaced by a clear, lightly yellow vapor. The lance operator continues the cutting action until the button is sectioned. The same procedure is used until the entire button is small enough for recharge to the furnace.

Figure 1:
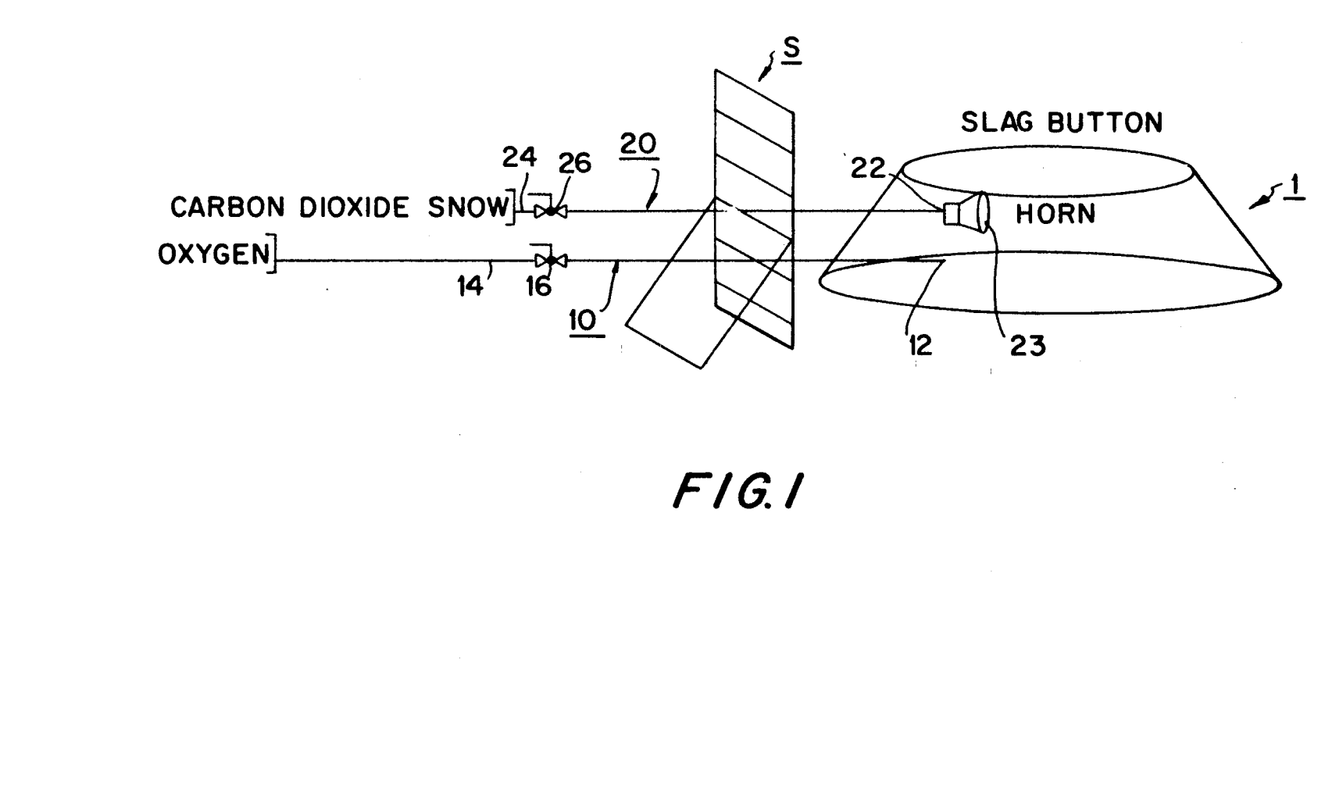
FIG. 1 is a diagrammatic illustration of one embodiment an apparatus in accordance with the present invention.

In accordance with the method and apparatus of the present invention and as illustrated in FIG. 1, a button 1 may be cut or burned into smaller pieces by a consumable oxygen lance 10 whose distal end 12 is consumed by the oxygen passing through it to supply the necessary heat energy to melt or burn the button 1. The lance 10 is supplied at its proximal end 14 with gaseous oxygen from a suitable source. A valve 15 is provided to control the flow as necessary.

A carbon dioxide-enriched, oxygen environment may be provided by supplying solid particles of carbon dioxide or carbon dioxide "snow" to the zone in which the subdivision (cutting or melting or burning) is occurring. In the embodiment of FIG. 1 a carbon dioxide snow conduit 20 is provided whose distal end 22 comprises a horn 23 from which the carbon dioxide snow is ejected into the subdivision zone. The horn 23 facilitates dispersion of the carbon dioxide. The proximal end 24 of the conduit 20 is supplied with carbon dioxide snow from a suitable source. Valve 26 is provided to control the flow of carbon dioxide snow and to shut off that flow as necessary. The operator may be protected by a suitable shield interposed between the operator and the distal end 12 of the lance 10.

In the subsequent description of alternative embodiments of the method and apparatus of the present invention corresponding elements have been given the same numbers in FIGS. 2 through 8 as those in FIG. 1. In the alternative embodiment of the present invention illustrated in FIG. 2, carbon dioxide snow is supplied to the proximal end 24 of carbon dioxide conduit 20 and controlled by valve 26 and dispensed to the subdivision zone through distal end 22, all as in the embodiment of FIG. 1, except that no horn is provided on the distal end 22.

Figure 2:
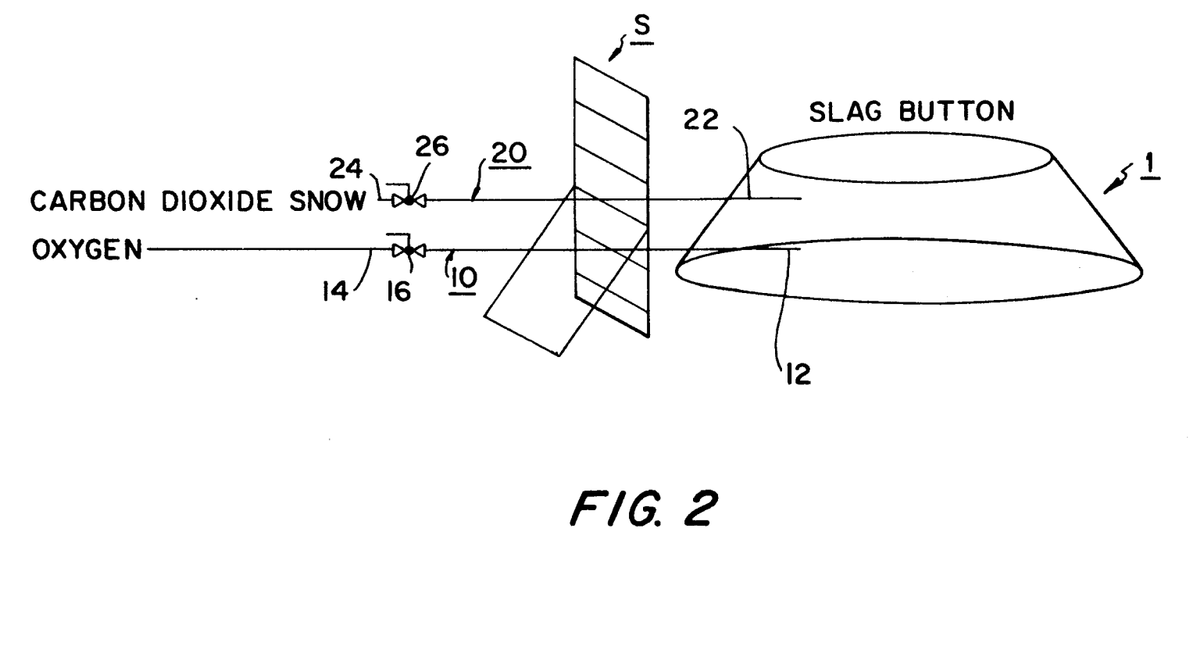
FIG. 2 is a diagrammatic illustration of another embodiment of an apparatus in accordance with the present invention.

In the further embodiment of the present invention illustrated in FIG. 3, the various elements perform as in the embodiment of FIG. 2, except that the carbon dioxide conduit 20 is supplied with gaseous carbon dioxide at its proximal end 24 and that gaseous carbon dioxide is controlled by valve 26 and dispensed as gaseous carbon dioxide to the subdivision zone by distal end 22.

In the still further embodiment of the present invention illustrated in FIG. 4, gaseous oxygen and gaseous carbon dioxide are supplied to proximal ends 1 and 24, respectively, and controlled by valves 16 and 26, respectively, as in the embodiment of FIG. 3. In the embodiment of FIG. 4, however, a mixing chamber 30 is provided for receiving the and mixing gaseous oxygen and gaseous carbon dioxide flows and providing carbon dioxide-enriched, oxygen flow as its output. The carbon dioxide-enriched oxygen flows from mixing chamber 30 down a consumable lance member 18 to distal end 12'.

Figure 5:
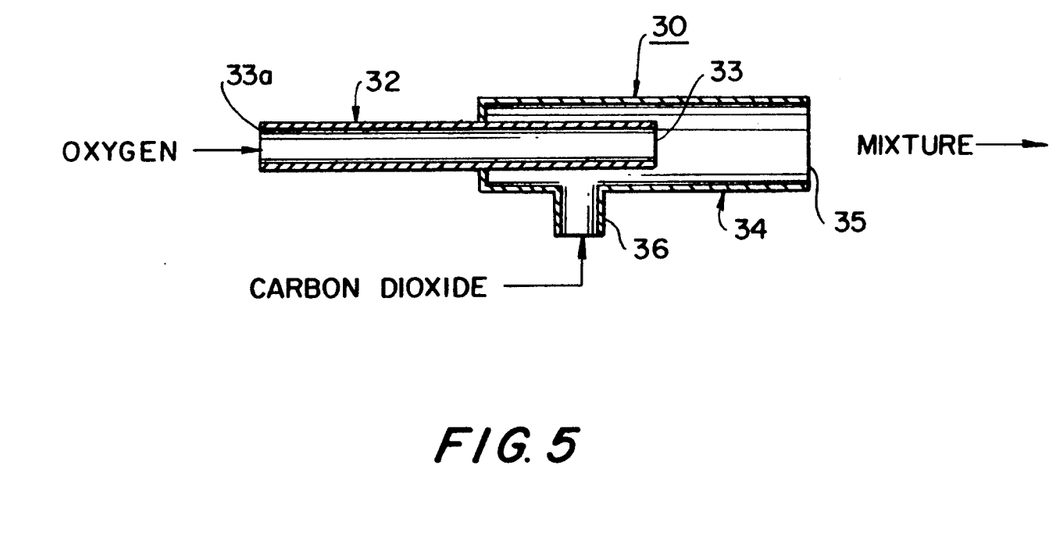
FIG. 5 is a diagrammatic illustration of an apparatus in accordance with the present invention for enriching gaseous oxygen with carbon dioxide.

FIG. 5 illustrates on embodiment of a mixing chamber 30 for use with the present invention. In this embodiment gaseous oxygen conduit 32 has a gaseous carbon dioxide conduit 34 circumferentially enclosing its distal end 33 and coaxially aligned with it. Gaseous oxygen enters the proximal end 33A of the oxygen conduit 32 and is dispensed to the interior of the mixing chamber 30 by the distal end 33 of the conduit 32. Gaseous carbon dioxide enters the mixing chamber 30 through an inlet conduit 36 extending out from the mixing chamber 30 in a radial direction with respect to the longitudinal central axis of the chamber 30 and the oxygen and carbon dioxide conduits 32 and 34, respectively. The distal end 33, or exit, of the oxygen conduit 32 is disposed downstream of the carbon dioxide inlet 36 with respect to the flow of gas through the chamber.

Figure 6:
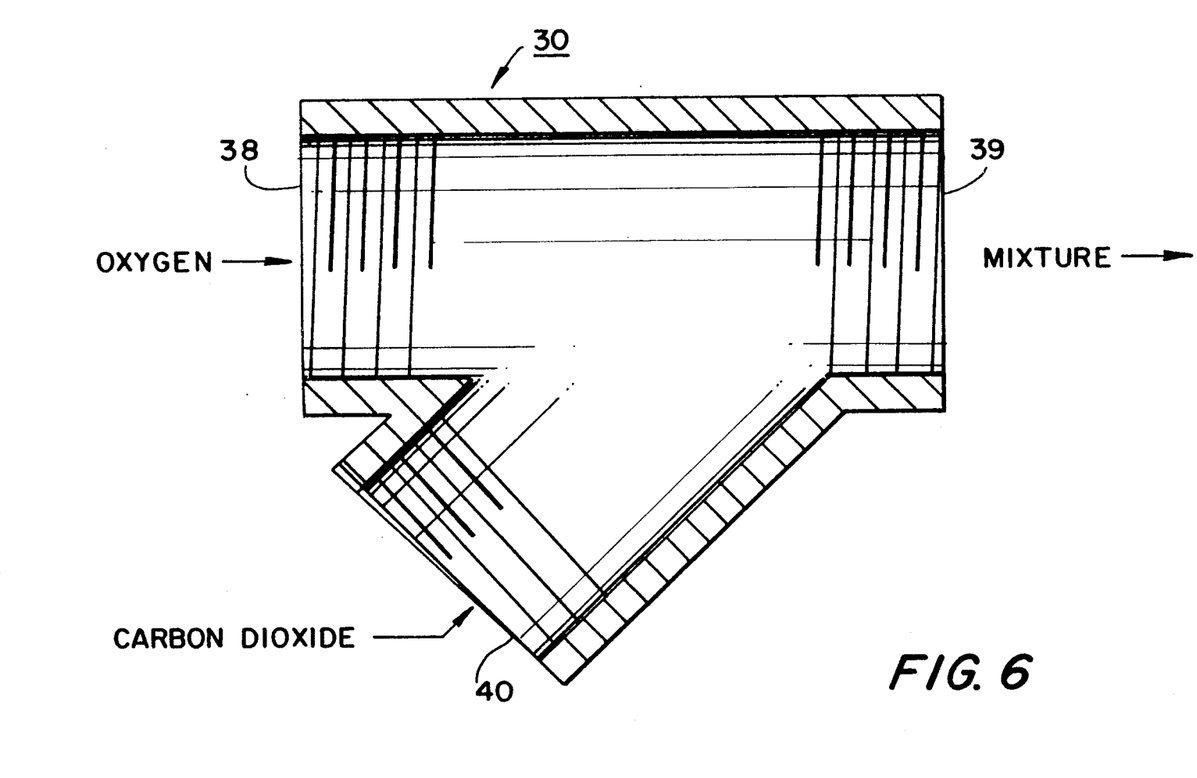
FIG. 6 is a diagrammatic illustration of a further embodiment of an apparatus in accordance with the present invention for enriching gaseous oxygen with carbon dioxide.

FIG. 6 illustrates a further embodiment of a mixing chamber 30 for use with the present invention. In this embodiment the gaseous oxygen inlet 38 and the carbon dioxide-enriched environment exit 39 are the axially aligned legs of a Y-shaped connector while the longitudinal central axis of the carbon dioxide inlet 40 intersects the longitudinal central axis common to the oxygen inlet 38 and the carbon dioxide-enriched, oxygen environment outlet 39 at an acute angle.

Figure 7:
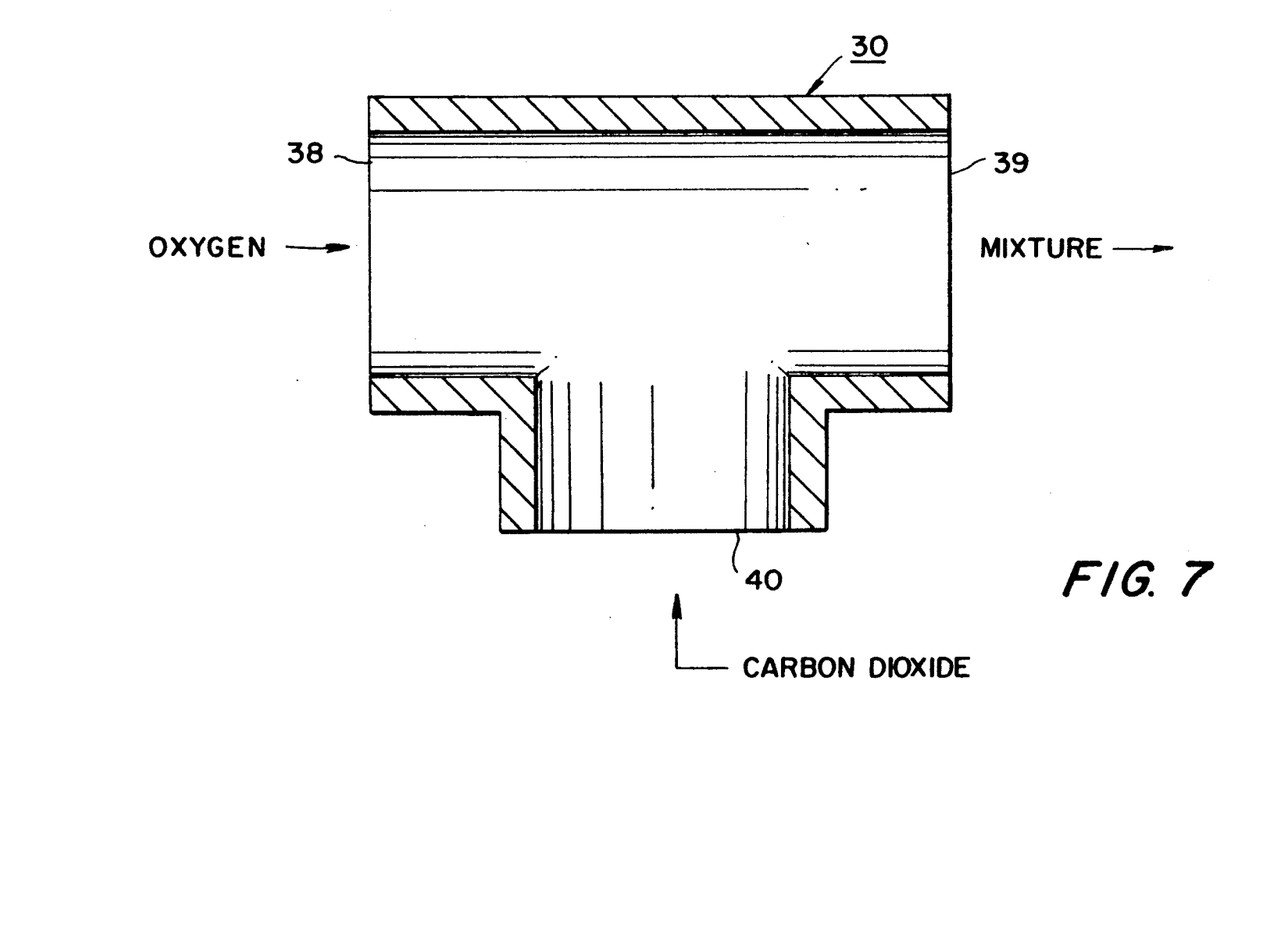
FIG. 7 is a diagrammatic illustration of a still further embodiment of an apparatus in accordance with the present invention for enriching gaseous oxygen with carbon dioxide and FIG. 8 is a schematic illustration of a preferred embodiment of an apparatus in accordance with the present invention for enriching gaseous oxygen with carbon dioxide.

In the embodiment of the mixing chamber 30 for use with the present invention illustrated in FIG. 7, the longitudinal central axis of the carbon dioxide inlet 40 intersects the longitudinal axis common to the oxygen inlet 38 and the carbon dioxide-enriched environment outlet 39 radially, i.e., at an appropriate right angle.

Figure 8:
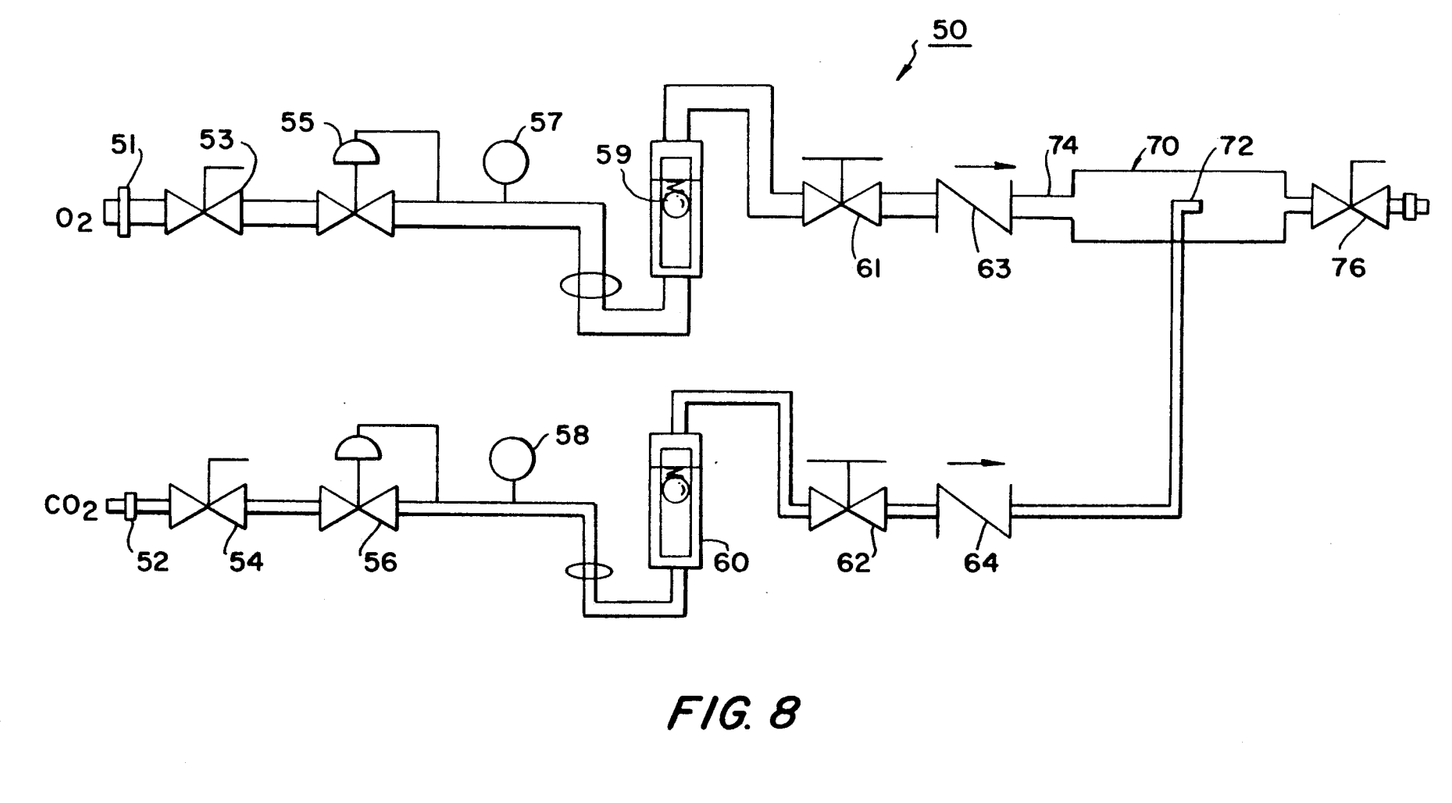

FIG. 8 schematically illustrates a preferred embodiment of a mixing means 50 for use with the present invention. In this embodiment oxygen carbon-dioxide are supplied from respective sources (not shown) to a pitot tube-type mixing chamber 70. The oxygen gas supply is connected to the mixing means 50 through a union 51 for ready connection and disconnection. It then passes through a control valve 53 for controlling its flow and then pressure regulator 55 for regulating its pressure. After regulation oxygen pressure is monitored by a pressure gauge 57 and them its flow rate by a flowmeter 59. A shutoff 59 permits compete shutoff of oxygen flow. A check valve 63 downstream prevents backflow of gases into the oxygen lines.

The carbon dioxide gas handling is similar to that for oxygen. The carbon dioxide gas supply is connected to the mixing means 50 through union 52. It then passes through control valve 54 to control its flow and pressure regulator 56 to regulate its pressure. Then the carbon dioxide gas pressure is monitored by pressure gauge 58 and them its flow rate by flow meter 60. The shutoff valve 62 downstream of the flowmeter 59 permits complete shutoff of carbon dioxide gas flow. The check valve 64 downstream of the shutoff valve prevents backflow of gases into the carbon dioxide gas lines.

Carbon dioxide ga exits into the pitot tube-type mixing chamber 70 through a nozzle 72 which is axially aligned with the longitudinal central axis of the chamber 70. There is mixes with the gas oxygen which has entered from an axially aligned inlet tube 74. Flow from the mixing chamber 70 to a consumable oxygen lance member (not shown) is controlled by control valve 76.

Supply of oxygen gas and carbon dioxide gas to the mixing means 50 is desirably at a pressure of about 100 to about 150 pounds per square inch (gauge). The pressure regulators 55 and 56 desirably reduce this pressure to about 75 to about 100 pounds per square inch gauge. It is desirable to maintain a carbon-dioxide gas pressure at the nozzle outlet 72 which is generally equal to the oxygen gas pressure at the inlet tube 74 to avoid backflow of oxygen gas into the carbon dioxide line.

Offgas emission samples generated during the traditional practice of oxygen cutting of slag typically generate the following analysis:

| | |
|---|---|
| $SO_2$ | = 5 ppm |
| $NO$ | < 1 ppm |
| $NO_2$ | < 1 ppm |

The emissions generated during the use of carbon dioxide enriched oxygen cutting of slag typically generate the following analysis:

| | |
|---|---|
| $SO_2$ | < 1 ppm |
| $NO$ | < 1 ppm |
| $NO_2$ | < 1 ppm |

Analysis of particulate samples generated by the traditional cutting of ferrous slags reveals that more FeO is in vapor form using only oxygen than is present using a mixture of carbon dioxide and oxygen. This verifies that carbon dioxide does in fact reduce the vaporization of FeO in the process. Similar conclusions can be drawn for aluminum, copper and other metallic slags processed in a similar manner.

Further, analysis of particulate generated by the traditional cutting of ferrous slags reveal that more FeO is produced in vapor form using pure oxygen and either nitrogen or a noble gas from Group 8 of the Periodic Chart or a combination of these gases than is present using only oxygen. This verifies that nitrogen, a noble gas from Group 8 of the Periodic Chart or a combination of these gases thereof does in fact increase the vaporization of FeO in this process. Similar conclusions can be drawn for aluminum, copper and other metallic slags processed in a similar manner.

The method and apparatus of the present invention are also adopted for cutting scrap. While fuel gas and oxygen are used to start a molten puddle before the addition of carbon dioxide, the cutting proceeds without the use of fuel gas. The cutting torch or lance is provided with two oxygen lines. The oxygen line for fuel gas does not employ carbon dioxide. A large oxygen line for cutting is premixed with carbon dioxide for fume suppression. The vapor indicative of scrap cutting is primarily a thick yellow fume. By adding carbon dioxide in small percentages to the cutting oxygen, the yellow smoke virtually disappears and is replaced by a clear, lightly white fume.

In order to understand the effect of oxygen and carbon dioxide in the vaporization of metals when burning or lancing and, more particularly, in the decrease of metal oxide fume generation, it is believed that an investigation of the reaction kinetics of the process of the present invention may be instructive. Two types of mechanisms appear to be responsible for controlling the rate of vaporization of metals: a chemical process and a transport process. The chemical process involves the formation of volatile metal compounds and the transport process involves the reaction of the metal in vapor phase with the gas phase very close to the metal solid-gas interface to form a finely divided condensed phase.

When metal vaporizes in a stream of gaseous oxygen, the counter flux of the metal vapor and the gaseous oxygen shows that at some short distance from the surface of the metal solid, iron vapor and gaseous oxygen react forming a metal oxide cloud. In the case of iron it is in accordance with the following equation:

$$2Fe\ (vapor) + O_2\ (gas) = > 2FeO\ (solid\ or\ liquid).$$

The formation of a metal oxide, which is in a state of fine subdivision in the gas phase, provides a sink for the metal vapor and the gaseous oxygen thereby resulting in the counter flux of these gaseous species.

When a steady state of counter flux is established under these conditions in an isothermal system, the concentration of metal vapor and gaseous oxygen close to the metal surface appears to be basically a linear relationship according to Fick's law. The formation of a layer of an iron oxide cloud does not interfere with the suggested mechanism; in practice, sufficient force or free convection to remove this iron oxide cloud layer is present.

For a given temperature and mass-transfer coefficient, the rate of vaporization of iron increases linearly with increasing partial pressure of oxygen. Increasing the partial pressure of oxygen deceases the distance through which the iron vapor is transported. Therefore, the two key parameters with respect to vaporization are:

1) The maximum free vaporization rate cannot be exceeded.

2) For a given metal and temperature, there is a minimum oxygen partial pressure below which the metal oxide cloud does not form.

In the case of iron, at temperatures above 1400° C., the surface of the metal solid will be covered by a layer of liquid iron oxide when this critical value is reached. At 1600° C., the vapor pressure of iron decreases by a factor of roughly $10^3$ when the oxide is in equilibrium with pure gaseous oxygen. Consequently at oxygen pressures in the gas stream above the critical value, the surface of the iron is coated with a layer of iron oxide and the rate of vaporization becomes increasingly small.

Depending on the oxygen potential of the oxide cloud formed, there is a minimum critical oxygen partial pressure below which an oxide cloud cannot be formed.

For Fe~FeO, the minimum critical value of
$p_{O2} = 4.13 \times 10^{-6}$ mm

For Cu~Cu$_2$O, the minimum critical value of
$p_{O2} = 1.65 \times 10^{-2}$ mm

Depending on the oxygen potential of the metal oxide cloud formed, there appears to be a minimum critical oxygen partial pressure below which a metal oxide cloud cannot be formed. It is believed that the addition of carbon dioxide in accordance with the present invention creates the desired partial pressure effect with respect to oxygen, whereby the vapor reaction of iron to iron oxide is limited. In summary, in accordance with the present invention the process reduces the dispersion of metal oxides into the atmosphere apparently by decreasing the vaporization potential of iron oxide and other metallic oxide during the lancing of slag or scrap. Further explanation of this possible mode of operation may be found in Turkdogan, E. T. et al., Enhancement of Diffusion-Limited Rates of Vaporization of Metals, IRON AND STEEL SOCIETY, Vol. 67, 1647–1654, (1963), the disclosure which is incorporated herein by reference.

While it is preferred to decrease the generation of metal oxide fumes, under certain circumstances it may be desirable to increase metal oxide fume generation. It has been found that if nitrogen or an inert gas selected from Group 8 of the Periodic Table is substituted instead of carbon dioxide, then metal oxide fume generation is increased. This is particularly surprising since it is a result contrary to Fick's law.

While the method and apparatus of the present invention have been described, in the particular and preferably, with respect to the subdivision of bodies having iron metal values, it should be understood that the method and apparatus also apply to the subdivision of bodies having other metal values, such as copper or aluminum.

We claim:

1. A method of decreasing metal oxide fume generation during the oxide-induced subdivision into smaller physical units of a body containing metal values said method comprises the steps of:
   a. providing a body containing metal values and
   b. subdividing said body with a consumable lance using gaseous oxygen in a carbon dioxide-enriched, oxygen environment in the absence of a fuel gas, 2. A method in accordance with claim 1 wherein the carbon dioxide is provided in solid form.

3. A method in accordance with claim 2 wherein the carbon dioxide is dispensed by a dispersion structure.

4. A method in accordance with claim 1 wherein the carbon dioxide is provided in gas form.

5. A method in accordance with claim 4 wherein the carbon dioxide is supplied to the environment through a conduit separate from the consumable lance.

6. A method in accordance with claim 4 wherein the carbon dioxide gas and gaseous oxygen are supplied to the consumable lance as a mixture of oxygen and carbon dioxide.

7. A method in accordance with claim 1 wherein the partial pressure of oxygen in the environment is less than the partial pressure of oxygen required to generate substantial visible metal oxide fumes.

8. A method in accordance with claim 1 wherein said metal value comprises iron.

9. A method in accordance with claim 1 wherein said metal value comprises aluminum.

10. A method in accordance with claim 1 wherein said metal value comprises copper.

11. A method in accordance with claim 1 wherein said consumable lance comprises iron or steel.

12. A method in accordance with claim 4 wherein the oxygen flows at a rate in the range of about 70 to about 150 standard cubic feet per minute and the carbon dioxide flows at a rate in the range of about 15 to about 60 standard cubic feet per minute.

13. A method in accordance with claim 4 wherein the oxygen pressure is in the range of about 60 to about 200 pounds per square inch (gauge) and the carbon dioxide pressure is in the range of about 60 to about 200 pounds per square inch (gauge).

14. A method in accordance with claim 6 wherein the mixture has at least three parts of oxygen by volume to one part of carbon dioxide by volume.

* * * * *